United States Patent Office 3,427,226
Patented Feb. 11, 1969

3,427,226
PROCESS FOR PREPARING POLYSACCHARIDE
William H. McNeely, San Diego, Calif., assignor to Kelco Company, San Diego, Calif., a corporation of Delaware
No Drawing. Filed Jan. 27, 1966, Ser. No. 523,276
U.S. Cl. 195—31                                 9 Claims
Int. Cl. A61k 27/00; C12b 3/06; C12d 13/00

ABSTRACT OF THE DISCLOSURE

A process for growing Xanthomonas bacteria in a seed fermentor, said process comprising incubating a fermentation medium including an inoculum organism of the genus Xanthomonas, and said medium containing flour or bran in amount ranging from about 1.0 to about 5% by weight with the flour and bran constituting about 100% of the total carbohydrate, the fermentation medium also containing magnesium ions and phosphorus in at least trace amounts, an organic nitrogen source in minor amount, and water; aerating the fermentation medium under conditions sufficient to produce a sulfite oxidation value ranging from about 1.5 to about 3.5 millimoles of oxygen per liter per minute; maintaining the pH of the fermentation medium within the range from about 6.5 to about 7.5, and removing the Xanthomonas bacteria from the seed fermentor for use as the inoculum organism in producing a Xanthomonas hydrophilic colloid through bacterial fermentation. A process for utilizing the seed bacteria produced by the above process for production of a Xanthomonas hydrophilic colloid in a final fermentation medium containing glucose in and amount ranging from about 1.0 to about 5.0% magnesium ions and phosphorus in at least trace amounts, a nitrogen source in minor amount, and water. The final fermentation medium is aerated under conditions sufficient to produce a sulfite oxidation value ranging from about 1.5 to about 3.5 millimoles of oxygen per liter per minute while the pH of the fermentation medium is maintained within the range from about 6.5 to about 7.5. After the fermentation is essentially completed, the Xanthomonas hydrophilic colloid is recovered.

---

This invention relates to a novel process for synthesizing certain polysaccharide polymers through the action of a bacteria of the genus Xanthomonas on carbohydrates. More particularly, the invention relates to a novel process in which the fermentation of carbohydrates by a bacteria of the genus Xanthomonas is carried out under controlled conditions which increase the growth rate of the bacteria and thereby produce the polysaccharide product through the use of a shorter final fermentation cycle.

Xanthomonas hydrophilic colloids have been previously produced by a process developed by chemists at the Northern Regional Research Laboratory of the United States Department of Agriculture at Peoria, Ill. This process, hereinafter called the Peoria process, employs a final stage fermentation which requires approximately four days. The fermentation cycle is carried out in a well aerated medium containing commercial dextrose, dried distillers' solubles, dibasic potassium phosphate, magnesium sulphate and water.

The aeration, organic nitrogen source, glucose, essentially neutral pH, and temperature of about 28° C., all as required by the Peoria process, are ideal conditions for the growth of many microorganisms. In a commercial fermentation process, it is difficult to maintain absolute sterility of the fermentation medium. As a result, there is considerable opportunity for the growth of contaminant bacteria which may grow faster than the bacteria of the genus Xanthomonas. When this occurs, the contaminant bacteria may become the predominant species in the fermentation medium. At worst, this could result in complete loss of the fermentation batch. Further, the desired product may contain viable spores of the contaminant bacteria. The Xanthomonas bacteria itself is a non-spore forming, gram-negative bacteria and does not survive the conditions employed in isolating the polysaccharide product.

In a shorter final fermentation cycle, the problem of bacterial contamination is considerably lessened. A shorter cycle does not provide as much time for a bacterial contaminant to grow or produce spores and to compete with the Xanthomonas bacteria for the available food supply in the nutrient medium. Moreover, a shorter final fermentation cycle produces great economies in equipment cost, labor and power costs required to produce the polysaccharide product.

An object of my invention is to provide a novel process for producing polysaccharides through the fermentation of carbohydrates with bacteria of the genus Xanthomonas.

A further object is to provide an improved process for preparing a Xanthomonas hydrophilic colloid through the fermentation of carbohydrates with a bacteria of the genus Xanthomonas, which utilizes a shortened final fermentation cycle.

Additional objects will become apparent from the description and claims which follow.

In accordance with my invention, I have discovered that the presence of a flour or bran in the fermentation medium employed for fermentation of carbohydrates by a bacteria of the genus Xanthomonas greatly increases the growth rate of the Xanthomonas bacteria. This results in a shortened fermentation cycle and increased production of Xanthomonas hydrophilic colloid.

In practicing by invention, a suitable fermentation medium is inoculated with an organism of the genus Xanthomonas and is permitted to incubate at about room temperature under aerobic conditions for a period of about 55 hours. The fermentation medium generally contains a suitable carbohydrate at a concentration of about 1 to about 5% by weight. Suitable carbohydrates include, for example, dextrose, sucrose, maltose, fructose, lactose, and corn starch. As a suitable carbohydrate, crude sugars may be used such as deionized molasses or a product such as Hydrol-E-081, manufactured by Corn Products Refining Co. Hydrol-E-081 is a mixture composed largely of dextrose and maltose and includes small amounts of oligosaccharides. A further ingredient which is present in the fermentation medium is a source of magnesium ions. The magnesium ion is present in the fermentation medium in at least trace amounts, e.g., about 0.0005 to about 0.0015 percent by weight, and suitable sources of magnesium ions include water soluble magnesium salts such as magnesium acetate, magnesium chloride, magnesium nitrate, and magnesium acid phosphate.

The pH of the fermentation medium is quite important to suitable growth of the Xanthomonas bacteria. I have found that colloid production of the Xanthomonas bacteria becomes inefficient below a pH of about 6.1. My preferred pH range is from about 6.5 to about 7.5. Control of the pH within this range can be obtained by the use of a buffer compound such as dipotassium acid phosphate at a concentration from about 0.4 to about 0.5 percent by weight of the fermentation medium. Conversely, the pH of the fermentation medium can be controlled through conventional means employing a pH meter coupled with a source of suitable base, such as a solution of potassium hydroxide. As the pH is lowered due to the production of acids in the fermentation reaction, small quantities of the potassium hydroxide solution may be automatically added by the pH control system to keep the pH within the desired range.

At least a trace quantity of phosphorus, generally in the form of a soluble phosphate salt, is also present in the fermentation medium. Larger quantities of phosphorus such as about 0.6 percent by weight, calculated as dipotassium acid phosphate, of the fermentation medium can, however, also be employed.

In order to obtain a rapid fermentation, I have discovered that it is essential to have the correct amount of oxygen available for the growing bacterial culture. If either too little or too much oxygen is available, the production of Xanthomonas hydrophilic colloid by the culture is slowed down. My process requires that the oxygen made available produce a sulfite oxidation value within the range of about 1.5 to about 3.5 millimoles of oxygen per liter per minute. Preferred sulfite oxidation values are from 2.0 to 3.0 millimoles of oxygen per liter per minute. A description of sulfite oxidation value is set forth in an article in Industrial Engineering Chemistry, vol. 36, p. 504 (1936) by C. M. Cooper, G. A. Fernstrom and S. A. Miller. The sulfite oxidation value is a measure of the rate of oxygen uptake in the fermentor under the agitation and aeration conditions employed.

A further ingredient which is present in the fermentation medium is a source of nitrogen. The nitrogen source may be organic in nature as, for example, an enzymatic digest of soybean meal such as Soy Peptone Type T or Promosoy 100, a pancreatic hydrolysate of casein such as N–Z Amine Type AT, an enzymatic digest of proteins such as Ferm-Amine Type IV, or distillers' solubles such as Stimuflav. Promosoy 100 is sold by Central Soya Chemurgy Division; Stimuflav is marketed by Hiram Walker & Sons, Inc., and the other materials are sold by Sheffield Chemical, Norwich, New York. When utilizing only an organic nitrogen source in the fermentation medium, it is present in an amount ranging between about 0.1 and about 0.6 percent by weight of the fermentation medium. A preferred range is about 0.4 to about 0.5 percent by weight.

As shown in my co-pending application entitled "Process for Producing a Polysaccharide," filed of even date herewith, ammonium nitrate may be employed as an inorganic nitrogen source in the fermentation medium. The subject matter of my co-pending application is incorporated herein by reference. The amount of ammonium nitrate employed ranges from about 0.02 to about 0.15 and preferably from about 0.045 to about 0.09 percent by weight of the fermentation medium.

In practicing my invention, a flour or bran derived from grains or legumes is employed in the final fermentation medium and/or in the seed fermentor preceding final fermentation. The flour or bran may be employed at a concentration ranging from about 0.02 to 5% by weight of the fermentation medium. The concentration of the carbohydrate employed, as previously stated, ranges from about 1 to about 5 percent by weight. The flour or bran is used as though it were a replacement for the carbohydrate. Thus, the total concentration of carbohydrate plus the flour or bran ranges between about 1 and about 5 percent with the flour or bran replacing as little as 2% or as much as 100% of the carbohydrate. The flour or bran employed can be derived from either grains or legumes. Appropriate flours or brans which may be employed are wheat flour, rye flour, oat flour, rice bran, barley flour, corn flour, and flours derived from soybeans and peas. This listing is merely illustrative and is not designed to include all of the many flours and brans derived from grain or legumes.

Preferably, the fluor or bran employed in my process is derived from grain and most preferably, the flour or bran is derived from rice. Use of rice flour or rice bran has been found to give a greatly improved growth rate of Xanthomonas bacteria, and a significant increase in the production rate of Xanthomonas hydrophilic colloid.

Mixtures of a flour or bran with a carbohydrate can be employed in the final fermentation medium. Suitable mixtures employ flour or bran as a replacement for about 15 percent of the carbohydrate, i.e., the total concentration of carbohydrate and flour or bran ranges from about 1 to about 5 percent with about 15 percent of the total being flour or bran.

In some instances I may employ a final fermentation medium in which flour or bran has been substituted for all of the carbohydrate. Grain flours or brans, e.g., rice flour, can be used to replace all of the carbohydrate in the final fermentation medium. Leguminous flours or brans, e.g., obtained from soybeans or peas, are not used as a replacement for more than 50% of the carbohydrate in the final fermentation medium since they do not contain a sufficient quantity of the materials required for efficient colloid production. When all or a very major portion of the carbohydrate in the final fermentation medium is replaced with a grain flour or bran, the viscosity of the colloid produced is lowered somewhat.

In practicing my process, the Xanthomonas bacteria employed in the final fermentation are grown in several stages prior to their introduction into the final fermentation medium. This procedure is employed in order to obtain a more vigorous growth of the bacteria in the final fermentation medium.

The growth of the Xanthomonas bacteria in the seed fermentor (the growth stage preceding transfer of the bacteria to the final fermentation medium) must be carefully controlled in order to obtain vigorous growth of the bacteria after they are transferred to the final fermentation medium. The conditions employed in the seed fermentor and final fermentor differ in a number of important respects. The most important difference concerns the concentration of the flour or bran employed in the fermentation media. As set forth previously, the flour or bran is employed in an amount which replaces from about 2 to 100% of the carbohydrate generally employed in the fermentation medium. Conversely, the flour or bran may not be employed at all in the final fermentation medium providing that it is employed in the fermentation medium employed in the seed fermentor, or vice versa. This description should not be understood as meaning that my invention does not require the use of a flour or bran in any of the several fermentation stages. It is essential that one of the fermentation stages, generally the seed fermentation stage preceding transfer of the bacteria to the final fermentation medium, employ a flour or bran in the fermentation medium.

In practice, I prefer to replace all of the carbohydrate in the seed fermentor with a flour or bran, as described previously. This results in a concentration of flour or bran in the seed fermentation medium which ranges from about 1 to about 5% by weight and provides bacteria which grow vigorously in the final fermentation medium. This shortens the time required for the final fermentation cycle.

I prefer to employ no bran or flour in the final fermentation medium. This results in a decreased bacterial growth rate in the final fermentor which, however, is offset by the fact that the product obtained is purer and contains less insolubles.

A further difference between the conditions in the seed fermentor and in the final fermentor concerns the content of an organic nitrogen source which I may employ. The various organic nitrogen sources are as defined previously. In the seed fermentor, I generally employ an organic nitrogen source in an amount ranging from about 0.1 to about 0.5% by weight in conjunction with ammonium nitrate in the amounts specified previously. However, in the final fermentation medium, I employ either none or a lesser amount of the organic nitrogen source in an amount up to about 0.1% by weight of the medium in conjunction with the ammonium nitrate in the amounts specified previously.

A further distinction between the seed fermentor and final fermentor concerns the condition of the flour or bran employed. As indicated in the examples which follow, the flour or bran may be partially hydrolyzed by an enzyme prior to its introduction into the fermentation medium. Partial hydrolysis of the flour or bran prior to its use is not essential to my process and this is especially true when the flour or bran is employed in the seed fermentor. Conversely, when the flour or bran is employed in the final fermentor, I prefer that it be partially hydrolyzed prior to use.

In other aspects, i.e., aeration rates, magnesium ion concentration, phosphorous concentration, etc., the process conditions employed in the final fermentor are the same as those employed in the seed fermentor.

To further illustrate my invention, there are presented the following examples in which all parts and percentages are by weight unless otherwise indicated:

Example I

A 33% slurry of rice flour and water was partially hydrolyzed to dextrose by stirring the slurry at 76° C. for 15 minutes after the addition of 0.06% of Rhozyme H-39, an amylase enzyme sold by Rohm and Haas Company, the concentration of Rhozyme H-39 being based on the weight of the rice flour employed. At the end of 15 minutes, the enzyme was inactivated through sterilization by heating with 15 p.s.i.g. steam for 30 minutes.

The enzymatically partially hydrolyzed rice flour was then added to water in an amount to give a 3% concentration of the hydrolyzed rice flour (calculated on the rice flour solids basis). With the water were added 0.5% of dry potassium acid phosphate (on an as is basis), 0.05% of Soy Peptone Type T (Sheffield Chemical Co.), 0.09% of ammonium nitrate, and 0.01% of magnesium sulphate heptahydrate. The total quantity of the resulting fermentation medium amounted to 6 gallons and was added to a 10-gallon fermentor. To the fermentation media was added an inoculant in an amount comprising 5% of the total volume of the mixture. The inoculant consisted of a culture of *Xanthomonas campestris* bacterium which had been incubated for 24 hours under aerobic conditions in a shake flask containing a YM broth nutrient. A mixture of ingredients used in preparing YM broth is sold by the Diffco Chemical Co. and contains the following ingredients in the following proportions:

| | Gms. |
|---|---|
| Bacto yeast extract | 3 |
| Malt extract, Diffco | 3 |
| Bacto-peptone | 5 |
| Bacto-dextrose | 10 |

The above quantities of ingredients are used to form a broth by adding water in an amount to form 1 liter of material. Such a nutrient broth was employed in incubating the *Xanthomonas campestris* bacterium employed as an inoculant.

The above fermentation mixture was maintained at 28° C. under aeration for 20 hours, at which time, the viscosity of the mixture was measured. The viscosity of the mixture, measured at 25° C. on a Brookfield Model LVF Viscosmeter using a No. 3 spindle at 60 r.p.m., was found to be 1200 centipoises (cps.). The viscosity of the fermentation mixture is a measure of the production of *Xanthomonas campestris* hydrophilic colloid in the fermentation process. The fermentation was then continued under aeration at 28° C. for an additional 35 hours (55 hours total), at which point the fermentation was complete. Completion of the fermentation reaction was determined by analyzing the medium for reducing sugars. Completion of the fermentation was defined as the point where the reducing sugars calculated as dextrose dropped below 0.1% by weight of the medium when the viscosity failed to increase with time.

Example II

The fermentation of Example I was repeated using identical conditions with the exception that 2% by weight of glucose (based on the total fermentation medium) was employed in place of the 3% partially hydrolyzed rice flour solids. The carbohydrate solids in the 2% glucose were the same as that in the 3% rice flour in Example I. The viscosity measurement was taken with a Brookfield Viscometer (as defined above) at the end of 20 hours. The viscosity of the fermentation mixture was found to be 50–60 cps. The fermentation reaction was continued for an additional 52 hours (72 hours total) to completion. As in Example I, completion of the fermentation was indicated by analyzing for the content of reducing sugars when the viscosity failed to increase with time.

Based on a comparison of Examples I and II, it can be seen that the use of partially hydrolyzed rice flour solids in place of the glucose, as employed in the Peoria process, resulted in a much shorter fermentation cycle. At the end of 20 hours, the viscosity of the fermentation medium employing partially hydrolyzed rice flour solids was in the order of 20 times that of the fermentation medium employing glucose.

Example III

A stock culture of *Xanthomonas campestris* bacteria was used to inoculate a sterile media containing 3% dextrose, 0.5% dipotassium phosphate, 0.3% of Soy Peptone Type T (Sheffield Chemical Co.), 0.045% ammonium nitrate, 0.01% magnesium sulphate heptahydrate, and the balance water. After incubation of the *Xanthomonas campestris* bacteria for 24 hours at 28° C. under aeration in a 4-liter shake flask, 1135 milliliters of the medium were used to inoculate 6 gallons of a sterile medium contained in a 10-gallon fermentor and having the following composition:

| | Percent |
|---|---|
| Dextrose | 2.55 |
| Rice flour solids (partially enzymatically hydrolyzed | 0.45 |
| Dipotassium phosphate | 0.5 |
| Soy Peptone Type T (Sheffield Chemical Co.) | 0.05 |
| Ammonium nitrate | 0.09 |
| Magnesium sulphate heptahydrate | 0.01 |
| Water | Balance |

The fermentation mixture was then incubated at 28° C. under aeration with an air flow rate of 0.4 cubic feet per minute measured at standard temperature and pressure. After 24 hours, the viscosity of the fermentation medium was measured in the manner employed in Example I and found to be 425 cps. After 55 hours of incubation, the fermentation was completed and the viscosity of the fermentation medium was 4000 cps.

Example IV

Example III was repeated employing the same conditions with the exception that the 0.45% rice flour solids and 2.55% glucose in the 10-gallon fermentor was replaced with 3% glucose, thereby giving a somewhat higher carbohydrate content than in Example III. After incubation for 24 hours, the viscosity was measured and found to be 115 cps. After 55 hours, the viscosity of the fermentation medium had reached 2450 cps. and after 72 hours, the fermentation was essentially complete. At this point, the viscosity of the fermentation medium had reached 3600 cps.

A comparison of Examples III and IV illustrates still further the greatly superior results obtainable with my process. In Example IV when no rice flour solids were present, the final fermentation cycle required 72 hours to reach completion. In contrast, my process, as illustrated in Example III, was complete in 55 hours. Moreover, the rapidity of my process is illustrated by a comparison of the viscosities observed in the fermentation media of Examples III and IV. At the end of 24 hours, my process produced a viscosity of 425 cps. or approximately 4 times that obtained at the end of the same period in Example IV. At the end of 55 hours, the viscosity of the fermentation medium in my process was more than 1500 cps. higher than the viscosity obtainable in Example IV.

In still other experiments, I repeated the fermentation procedure set forth in Example III with the exception that various flours or brans were employed in combination with glucose in the final fermentation stage. The results of these experiments are set forth in the following table in which the concentration of the glucose and bran or flour in the final fermentation media is set forth together with the viscosities of the fermentation media observed at 24, 48 and 72 hours.

TABLE I

| | Viscosity at 24 hours (cps.) | Viscosity at 48 hours (cps.) | Viscosity at 72 hours (cps.) |
|---|---|---|---|
| Control media with 3% glucose only | 70, 115 | 1,650, 2,230 | 3,000, 3,300 |
| Media with 0.45% brown rice flour solids (partially hydrolyzed enzymatically), and 2.55% glucose | 450, 500 | 3,600, 3,570 | |
| Media with 0.45% white rice flour solids (partially hydrolyzed enzymatically), and 2.55% glucose | 430, 340 | 3,500, 3,200 | |
| Media with 0.45% rice bran solids (partially hydrolyzed enzymatically), and 2.55% glucose | 600, 595 | ¹ 4,040, 4,120 | |

¹ Completed.

As illustrated in the above table, the fermentation medium containing rice bran solids in conjunction with glucose was superior to that containing either brown rice flour or white rice flour solids in conjunction with glucose. This fermentation medium produced complete fermentation at the end of only 48 hours. The medium employing brown rice flour solids in admixture with glucose was found to be slightly superior to that employing white rice flour solids in conjunction with glucose. The control medium containing 3% glucose, was found to be quite inferior to all of the other fermentation media.

In a still further series of experiments, a number of different flours were employed in conjunction with the glucose in the same fermentation procedure described in Example III. In each case, the flour was first partially hydrolyzed by heating a 33% slurry of the flour and water at 76° C. for 15 minutes with 0.06% (by weight of the rice flour solids) of an amylase enzyme in the form of Rhozyme H-39, supplied by Rohm and Haas Company. The heating was conducted with agitation and after 15 minutes the enzyme was sterilized by heating with 15 p.s.i.g. steam for 30 minutes.

Employing the conditions of Example III, the final fermentation runs in the 10-gallon fermentor were carried out in duplicate at 28° C. under agitation. Aeration was maintained at a rate of 0.4 cubic feet per minute computed at standard temperature and pressure.

TABLE II

| | Viscosity at 24 hours (cps.) | Viscosity at 48 hours (cps.) | Viscosity at 72 hours (cps.) |
|---|---|---|---|
| 3% glucose | 220, 175 | 2,250, 2,550 | 3,950, 3,900 |
| 0.45% barley flour solids (partially hydrolyzed enzymatically), and 2.55% glucose | 1,500, 1,560 | 3,850, 3,880 | |
| 0.45% rice flour solids (partially hydrolyzed enzymatically), and 2.55% glucose | 1,370, 880 | 3,870, 3,800 | |
| 0.45% wheat flour solids (partially hydrolyzed enzymatically), and 2.55% glucose | 1,560, 1,710 | 3,540, 3,700 | |

The series of tests in Table II show a comparison of fermentation media containing barley flour, rice flour, or wheat flour in admixture with glucose with the total concentration of flour and glucose being 3% by weight. As a control basis for comparison, tests were also run with a fermentation medium employing only glucose at a 3% level. In each case, the use of a grain flour in admixture with glucose gave markedly superior fermentations to glucose alone, as used in the Peoria process.

TABLE III

| | Viscosity at 24 hours (cps.) | Viscosity at 48 hours (cps.) | Viscosity at 72 hours (cps.) |
|---|---|---|---|
| FIRST SERIES | | | |
| 3% glucose | 125, 120 | | |
| 0.45% corn flour solids (partially hydrolyzed enzymatically), and 2.55% glucose | 850, 850 | | |
| SECOND SERIES | | | |
| 3% glucose | 65, 70 | 2,300, 2,350 | 3,775, 4,150 |
| 0.45% oat flour solids (partially hydrolyzed enzymatically), and 2.55% glucose | 820, 860 | 3,370, 3,200 | |
| 0.45% rye flour solids (partially hydrolyzed enzymatically), and 2.55% glucose | 710, 780 | 3,400, 3,580 | |

Two series of tests are reported in Table III. As in the previous tests, a large quantity of fermentation media was made up for each test series. The media was then divided into aliquot portions which were employed for individual test runs after addition thereto of bran or flour in combination with glucose. In each run 6 gallons of fermentation media were employed and the fermentation was carried out in a 10-gallon fermentor using the same conditions as employed in Example III.

To provide a true basis for comparison, control tests employing only glucose were performed for each of the test series. The differences in the absolute viscosity values observed for the control tests in different test series are within the normal variations experienced in repeated control runs due to slight variations in culture vigor and slight variations in aeration, temperature and sulfite oxidation values of individual fermentors.

In each case, the viscosity measurements were made in the same manner as in Example III using a Brookfield Model LVF Viscometer having a No. 3 spindle rotating at 60 r.p.m.

As shown in Table III, the nutrient media formulated according to my invention and containing a flour in conjunction with glucose all gave fermentations which were superior to those obtained through use of glucose without the presence of flour.

In each case, the *Xanthomonas campestris* hydrophilic colloid was isolated from the final fermentation beer by precipitation with two volumes of isopropyl alcohol. Following its precipitation, the colloid was then dried and milled. Reconstituted one-percent solutions of the *Xanthomonas campestris* hydrophilic colloid in water were prepared from the colloids prepared in each of the fermentations employing a flour in conjunction with glucose. These solutions were found to be comparable in viscosity to that of a one-percent reconstituted solution of *Xanthomonas campestris* hydrophilic colloid obtained from a fermentation using only 3% glucose.

In still further experiments, using the fermentation procedure of Example III, a nutrient medium containing 0.45% soybean flour solids (partially hydrolyzed enzymatically) and 2.55% glucose gave viscosities at 24 hours of 2560 and 2400 cps. The control test, in which the nutrient medium contained 3% glucose, gave viscosities at 24 hours of 125 and 120 cps.

The xanthomonas hydrophilic colloid obtained according to my process can be readily separated from the fermentation beer through precipitation with an alcohol, as illustrated above. Conversely, the Xanthomonas hydrophilic colloid can be obtained from the beer by passing the entire beer through a drum dryer. Any equivalent mode of separation can also be employed such as, for example, spray drying, vacuum drying, freeze drying, and the like.

Although I have illustrated my invention primarily with regard to the employment of the *Xanthomonas campestris* species of bacteria, other bacterial species of the genus Xanthomonas may also be employed in my process. Illustrative species include *Xanthomonas phaseoli*, *Xanthomonas malvacearum*, *Xanthomonas, carotae*, *Xanthomonas begoniae*, *Xanthomonas incanae*, and *Xanthomonas vesicatoria*. Of the various species of Xanthomonas bacteria, I prefer the *Xanthomonas campestris* and *Xanthomonas malvacearum* since these species work particularly well in my process.

The Xanthomonas hydrophilic colloids produced by my process are, as stated previously, colloidal materials produced by bacteria of the genus Xanthomonas. Illustrative of such colloidal materials is the hydrophilic colloid produced by *Xanthomonas campestris* bacterium. This colloid is a high molecular weight, exocellular material in which the polymer contains mannose, glucose, potassium glucuronate and acetyl radicals. The potassium portion of the colloid can be replaced by several other cations without substantial change in the properties of the material.

The Xanthomonas hydrophilic colloids produced according to my process may be employed as additives in drilling muds to reduce fluid loss and to suspend the solid materials contained in the mud. Moreover, the colloids may be employed as thickening agents in producing thickened water to be used in the secondary recovery of oil through water flooding.

As illustrated by the foregoing discussion, my invention is a broad one. The use of flour or bran as derived from legumes and preferably cereal grains such as wheat, rye, oats, rice, barley or corn results in greatly decreasing the time required in the final fermentation stage in the production of a Xanthomonas hydrophilic colloid through fermentation of carbohydrates with a bacterial species of the genus Xanthomonas. In illustrating my invention, I have made reference to specific times, temperatures, compositions, etc. However, I intend that my invention be limited only by the lawful scope of the appended claims and not by the foregoing description.

I claim:

1. The process for growing a Xanthomonas bacteria in a seed fermentor, said process comprising incubating a fermentation medium including an inoculum organism of the genus Xanthomonas, said medium containing as the carbohydrate source an ingredient selected from the group consisting of flour and bran, the total quantity of said carbohydrate source ranging from about 1 to about 5% by weight with said flour and bran constituting about 100% of said carbohydrate source, magnesium ions and phosphorous in at least trace amounts, an organic nitrogen source in minor amount, and water, aerating said fermentation medium under conditions sufficient to produce a sulfite oxidation value ranging from about 1.5 to about 3.5 millimoles of oxygen per liter per minute, maintaining the pH of the fermentation medium within the range from about 6.5 to about 7.5, and removing said bacteria from said fermentor for use as the inoculum organism in producing a Xanthomonas hydrophilic colloid through bacterial fermentation.

2. The process of claim 1 wherein said flour and bran is derived from grain.

3. The process of claim 1 wherein said flour and bran is derived from rice.

4. The process of claim 1 wherein said fermentation medium contains an organic nitrogen source in an amount ranging from about 0.1 to about 0.5% by weight and ammonium nitrate in an amount ranging from about 0.02 to about 0.15% by weight.

5. The process of claim 4 wherein said amonium nitrate ranges from about 0.045 to about 0.09% by weight.

6. A fermentation process for producing a Xanthomonas hydrophilic colloid, said process comprising incubating a final fermentation medium including an inoculum organism of the genus Xanthomonas prepared according to the proces of claim 1, said medium containing glucose in an amount ranging from about 1 to about 5% by weight, magnesium ions and phosphorus in at least trace amounts, a nitrogen source in minor amount, and water, aerating said fermentation medium under conditions sufficient to produce a sulfite oxidation value ranging from about 1.5 to about 3.5 millimoles of oxygen per liter per minute, maintaining the pH of the fermentation medium within the range from about 6.5 to about 7.5 and recovering the hydrophilic colloid produced by said Xanthomonas bacteria.

7. The process of claim 6 wherein an organic nitrogen source is present in said fermentation medium in an amount up to about 0.1% by weight in conjunction with ammonium nitrate in an amount ranging from about 0.02 to about 0.15% by weight of said fermentation medium.

8. The process of claim 6 wherein the aeration rate is controlled to give a sulfite oxidation value ranging from 2 to 3.

9. The process of claim 6 wherein said organism is a *Xanthomonas campestris* bacteria.

References Cited

UNITED STATES PATENTS

| 2,567,000 | 9/1951 | Wallerstein et al. | 195—11 |
| 3,096,293 | 7/1963 | Jeanes et al. | |
| 3,271,267 | 9/1966 | Weber et al. | |

ALVIN E. TANENHOLTZ, *Primary Examiner.*

U.S. Cl. X.R.

195—96, 100, 109